United States Patent
Watanpour et al.

(10) Patent No.: US 9,638,060 B2
(45) Date of Patent: May 2, 2017

(54) BEARING HOUSING OF AN EXHAUST-GAS TURBOCHARGER

(75) Inventors: Jens Watanpour, Viernheim (DE); Andreas Baumgartl, Lampertheim (DE); Josef-Hans Hemer, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 818 days.

(21) Appl. No.: 14/007,155

(22) PCT Filed: Mar. 19, 2012

(86) PCT No.: PCT/US2012/029622
§ 371 (c)(1),
(2), (4) Date: Sep. 24, 2013

(87) PCT Pub. No.: WO2012/141846
PCT Pub. Date: Oct. 18, 2012

(65) Prior Publication Data
US 2014/0023496 A1 Jan. 23, 2014

(30) Foreign Application Priority Data

Apr. 11, 2011 (DE) .......... 10 2011 016 715

(51) Int. Cl.
*F01D 25/16* (2006.01)
*F01D 25/24* (2006.01)
*F02B 39/00* (2006.01)

(52) U.S. Cl.
CPC .......... *F01D 25/16* (2013.01); *F01D 25/166* (2013.01); *F01D 25/24* (2013.01); *F02B 39/00* (2013.01); *F05D 2220/40* (2013.01); *F05D 2230/64* (2013.01); *F05D 2240/50* (2013.01); *F05D 2260/30* (2013.01)

(58) Field of Classification Search
CPC ........ F01D 25/16; F01D 25/166; F01D 25/24; F02B 39/00; F05D 2220/40; F05D 2230/64; F05D 2240/50; F05D 2260/30
USPC ......................................... 415/110
See application file for complete search history.

(56) References Cited

U.S. PATENT DOCUMENTS

| 4,279,576 | A | * | 7/1981 | Okano | F02B 37/00 324/173 |
| 4,902,144 | A | * | 2/1990 | Thoren | F01D 25/166 384/287 |
| 7,670,056 | B2 | * | 3/2010 | Petitjean | F01D 25/16 384/284 |
| 2006/0140751 | A1 | * | 6/2006 | Boening | F01D 17/165 415/160 |
| 2007/0130943 | A1 | * | 6/2007 | Sausse | F01D 17/165 60/602 |

(Continued)

*Primary Examiner* — Ninh H Nguyen
*Assistant Examiner* — Aaron R Eastman
(74) *Attorney, Agent, or Firm* — A. Michael Tucker; Stephan A. Pendorf; Patent Central LLC

(57) ABSTRACT

A bearing housing (1) of an exhaust-gas turbocharger (EGT), having a mounting bore (2); a bearing device (3) which has two bearing bushes (4, 5) which are arranged in the mounting bore (2), between which bearing bushes is arranged a spacer (6); a rotational speed sensor (7) which engages into a sensor recess (8) of the spacer (6); and a locating pin (9) which is screwed into a pin bore (10) and which engages with its pin head (12) into a pin recess (11) of the spacer (6); wherein the pin recess (11) is formed as a slot.

11 Claims, 5 Drawing Sheets

(56) References Cited

U.S. PATENT DOCUMENTS

| | | | |
|---|---|---|---|
| 2009/0136368 A1* | 5/2009 | Arnold | F01D 5/027 417/407 |
| 2010/0135785 A1* | 6/2010 | Just | F01D 5/04 415/229 |
| 2010/0247266 A1* | 9/2010 | Staniszewski | F16B 39/126 411/201 |
| 2011/0274379 A1* | 11/2011 | Fiedler | F01D 25/164 384/91 |
| 2012/0060496 A1* | 3/2012 | Hertweck | F02C 6/12 60/605.1 |

* cited by examiner

BEARING HOUSING OF AN EXHAUST-GAS TURBOCHARGER

The invention relates to a bearing housing as per the preamble of claim 1 and to a spacer as per the preamble of claim 9.

A generic bearing housing has a mounting bore in which a bearing device for mounting the shaft of the exhaust-gas turbocharger is arranged. Said bearing device has two bearing bushes, the spacing of which to one another is determined by a spacer arranged between the bearing bushes. In this way, a two-part floating bush bearing arrangement is preferably formed, wherein as a result of the rotation of the shaft, a torque is transmitted via the oil film to the bearing bushes, thereby causing the bearing bushes to co-rotate at approximately half of the rotational speed of the shaft. Said torque is in turn transmitted from the bearing bushes at the end sides thereof to the spacer, such that a so-called locating pin must be inserted into the spacer to prevent it from co-rotating. Said locating pin is for example a screw which is screwed into the bearing housing from the outside and the screw end of which engages into a recess of the spacer. The co-rotation of the spacer is hereby prevented, which is necessary because a sensor for measuring the rotor shaft engages into a bore of the spacer arranged diametrically opposite the locating pin. Said sensor must be arranged with its sensor head directly at the shaft surface without making contact with the shaft and without the sensor being damaged, together with the spacer, by a co-rotation of the spacer which would occur without the locating pin.

It is an object of the present invention to provide a bearing housing of the type specified in the preamble of claim 1 which can be assembled in a simple manner in comparison with the prior art and which at the same time permits reliable prevention of the co-rotation of the spacer and therefore damage to the rotational speed sensor and to the spacer.

Said object is achieved by means of the features of claim 1.

Although DE 10 2009 016 688 A1 discloses a sleeve element which has a passage opening, formed as a slot, for a rotational speed sensor, said sleeve element is not provided with a pin bore, such that during an exchange of the rotational speed sensor, an undesired rotation of the sleeve element can occur, as a result of which assembly problems may arise during the exchange of the rotational speed sensor.

The subclaims relate to advantageous refinements of the invention.

According to the invention, there is accordingly provided a closed spacer or a closed spacer bush which has two axially symmetrical slots and preferably two symmetrical oil drainage bores. As a result, directional installation of the spacer or of the spacer bush is not necessary. In fact, in the bearing housing, the locating pin, which is preferably designed as a screw, is screwed into the bearing housing through the spacer, which is possible in the case of spacers which are already arranged in the bearing housing because the locating pin can be guided through the mutually opposite recesses. The bearings can thereafter be arranged in the bearing housing, and the rotor shaft and the rotational speed sensor can be mounted subsequently.

Furthermore, the provision of preferably two closed slots advantageously has the effect that the end surfaces of the spacer bear over their full area against the respectively adjacent bearings, such that the spacer does not adversely affect the bearings during operation of the exhaust-gas turbocharger.

The rotational speed sensor (speed sensor) is screwed into the bearing housing from the other side such that the head of said rotational speed sensor projects through the associated sensor recess and can thereby be arranged close to the rotor shaft in order to ensure reliable signal pickup. Here, the rotational speed sensor may be provided with a threaded portion with a self-locking thread, which prevents the rotational speed sensor from becoming detached from its mounted position.

In contrast to the prior art, said design furthermore permits easy exchange of the rotational speed sensor, because during the removal of a rotational speed sensor to be exchanged, the spacer or spacer bush is held in its correct mounted position by the locating pin, such that when the new rotational speed sensor is screwed in, it can be mounted again into its correct mounted position close to the rotor shaft through the associated sensor recess.

The locating pin may be formed as an internally situated cylinder head screw.

The invention also relates to a spacer as claimed in claims 9 to 11 as a separately marketable object.

Further details, advantages and features of the present invention will emerge from the subsequent description of exemplary embodiments on the basis of the drawing, in which.

Figure 1:
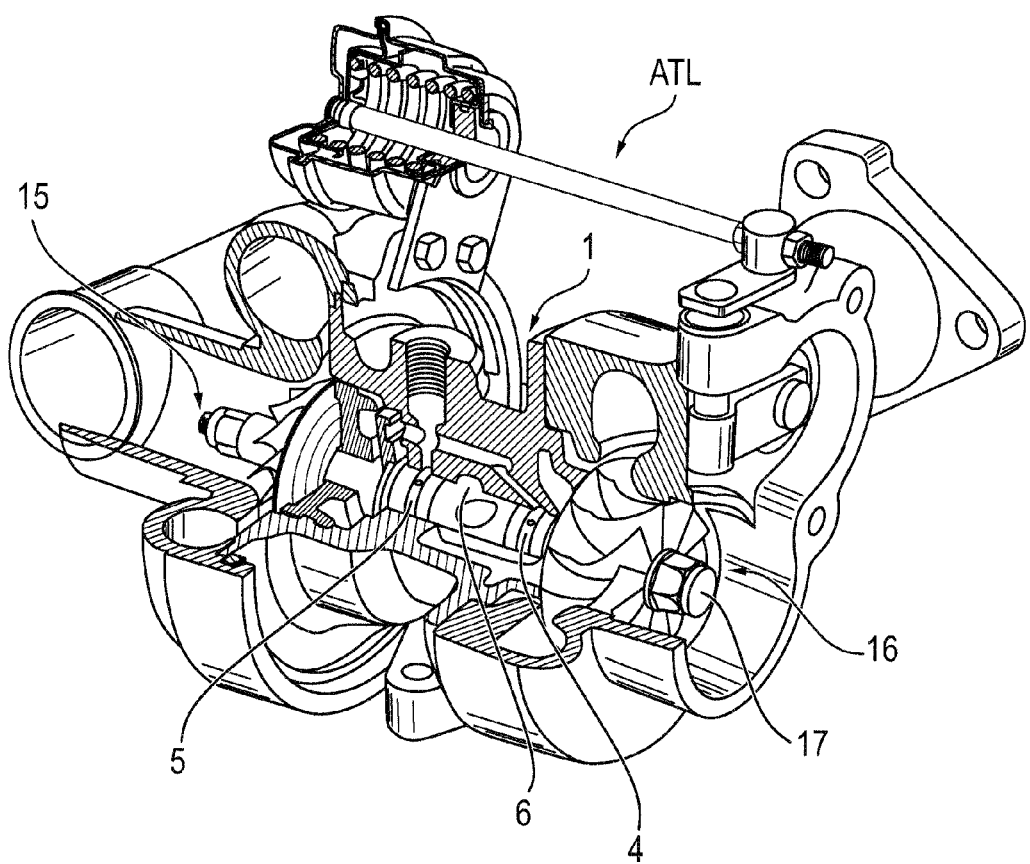
FIG. 1 shows a view of an exhaust-gas turbocharger according to the invention which can be provided with a bearing housing according to the principles of the present invention.

FIG. 1 illustrates an exhaust-gas turbocharger EGT according to the invention which has a turbine 16 and a compressor 15 which are connected to one another via a bearing housing 1 in which a shaft 17 is mounted.

Figure 2:
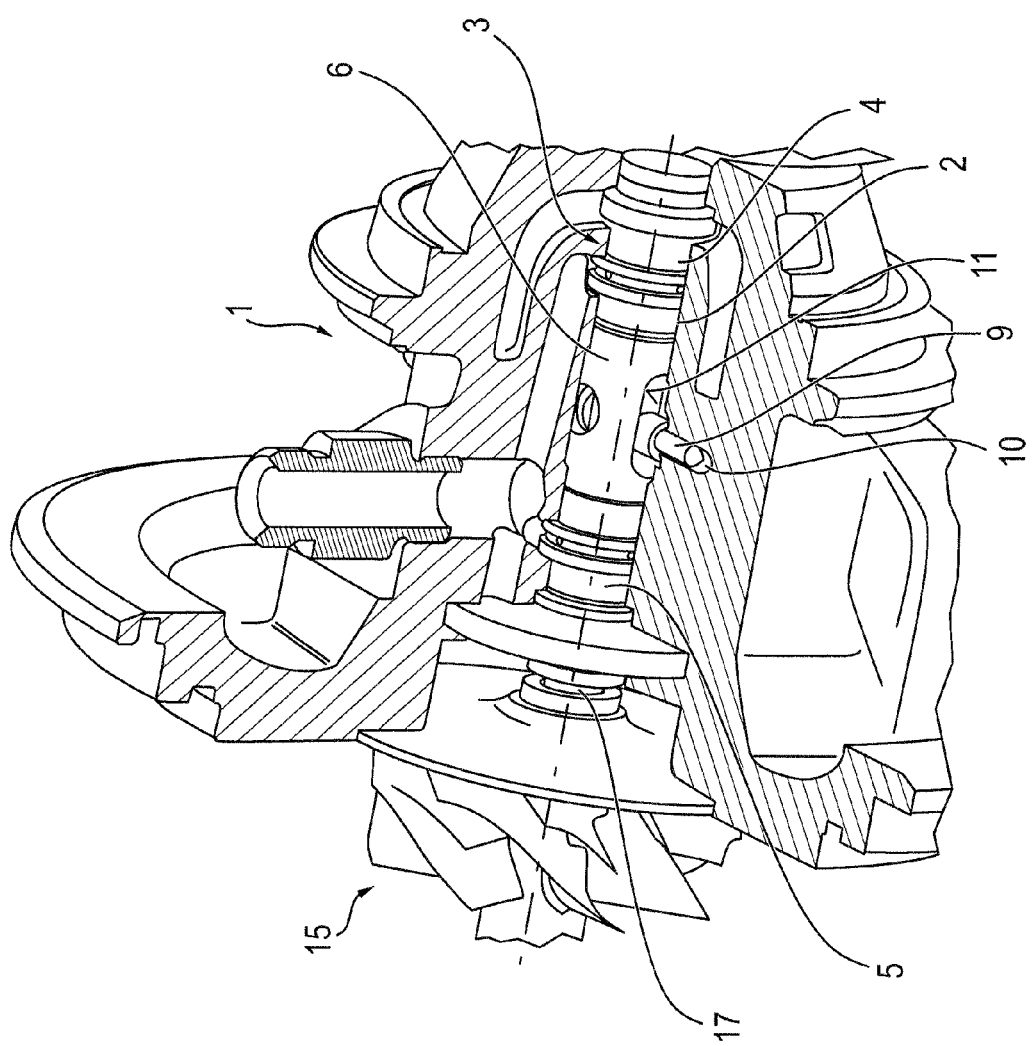
FIG. 2 shows a cut-away perspective illustration of a bearing housing according to the invention.

As shown in the cut-away perspective illustration of FIG. 2, the bearing housing 1 according to the invention has a mounting bore 2 which runs in the axial direction through the bearing housing 1. Arranged in the mounting bore 2 is a bearing device 3 with two bearing bushes 4 and 5 which are held spaced apart by a spacer 6.

FIG. 2 also shows that the rotor shaft 17 is guided through the bearing bushes 4 and 5 in the bearing housing 1.

Furthermore, FIG. 2 shows a pin bore 10 which is arranged in the bearing housing 1 and in which is inserted a locating pin 9 which serves as a rotation prevention means, as will be explained in detail below on the basis of a juxtaposition of FIGS. 4 and 5.

Figure 3:
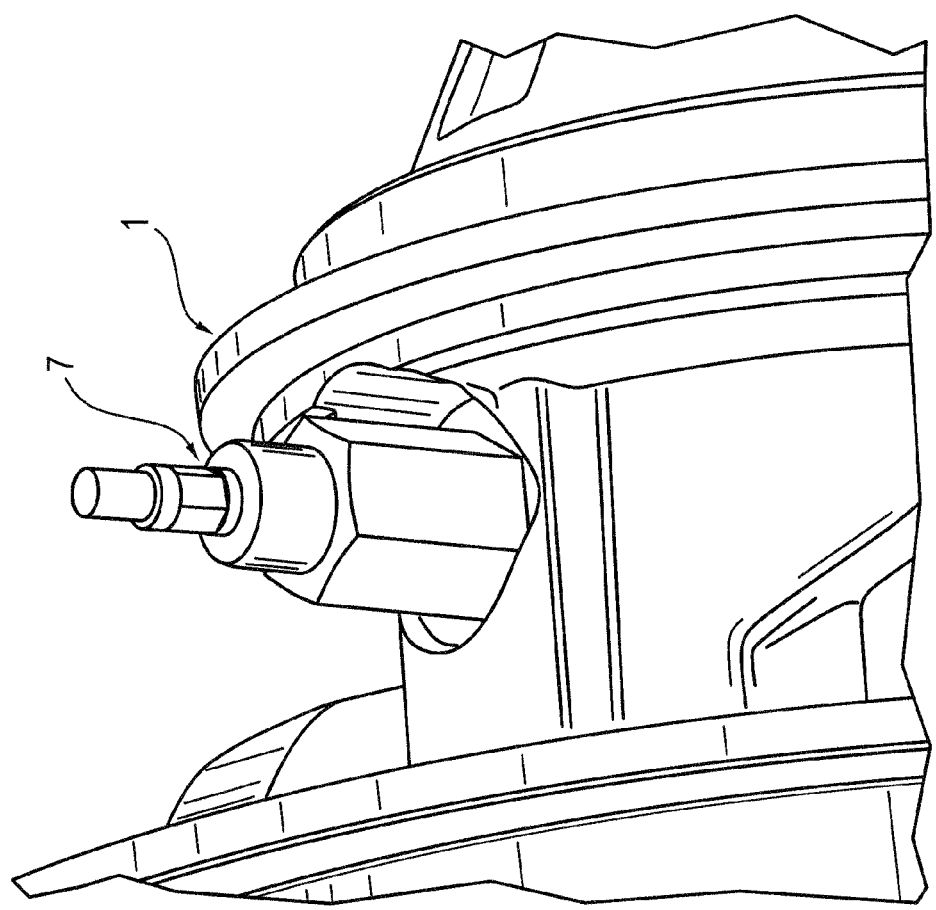
FIG. 3 shows an enlarged view of a rotational speed sensor mounted in the bearing housing.

The bearing housing 1 is furthermore provided with a rotational speed sensor which, owing to the illustration selected in FIG. 2, is not visible in said figure. The rotational speed sensor 7 is shown in the mounted state in the illustration of FIG. 3.

Figure 4:
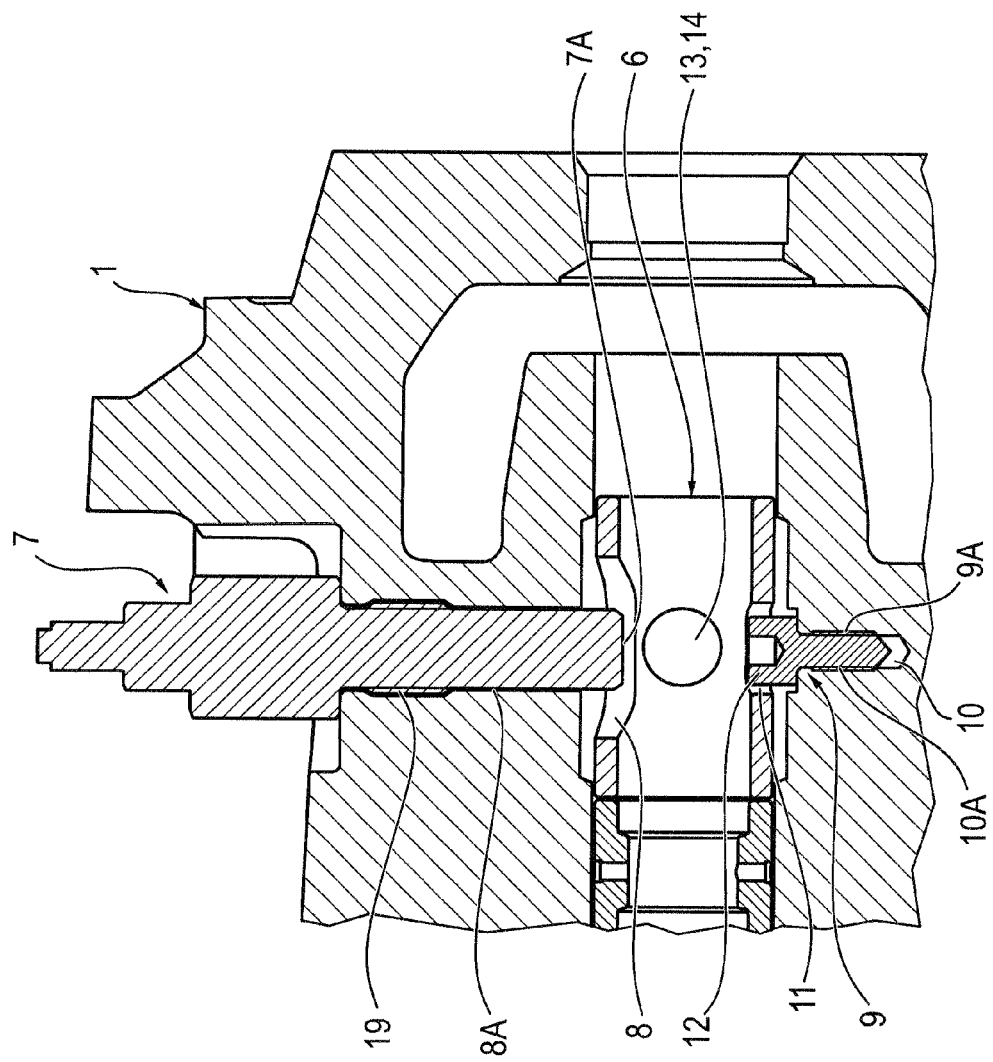
FIG. 4 shows a longitudinal section through a part of the bearing housing as per FIG. 2.
Figure 5:
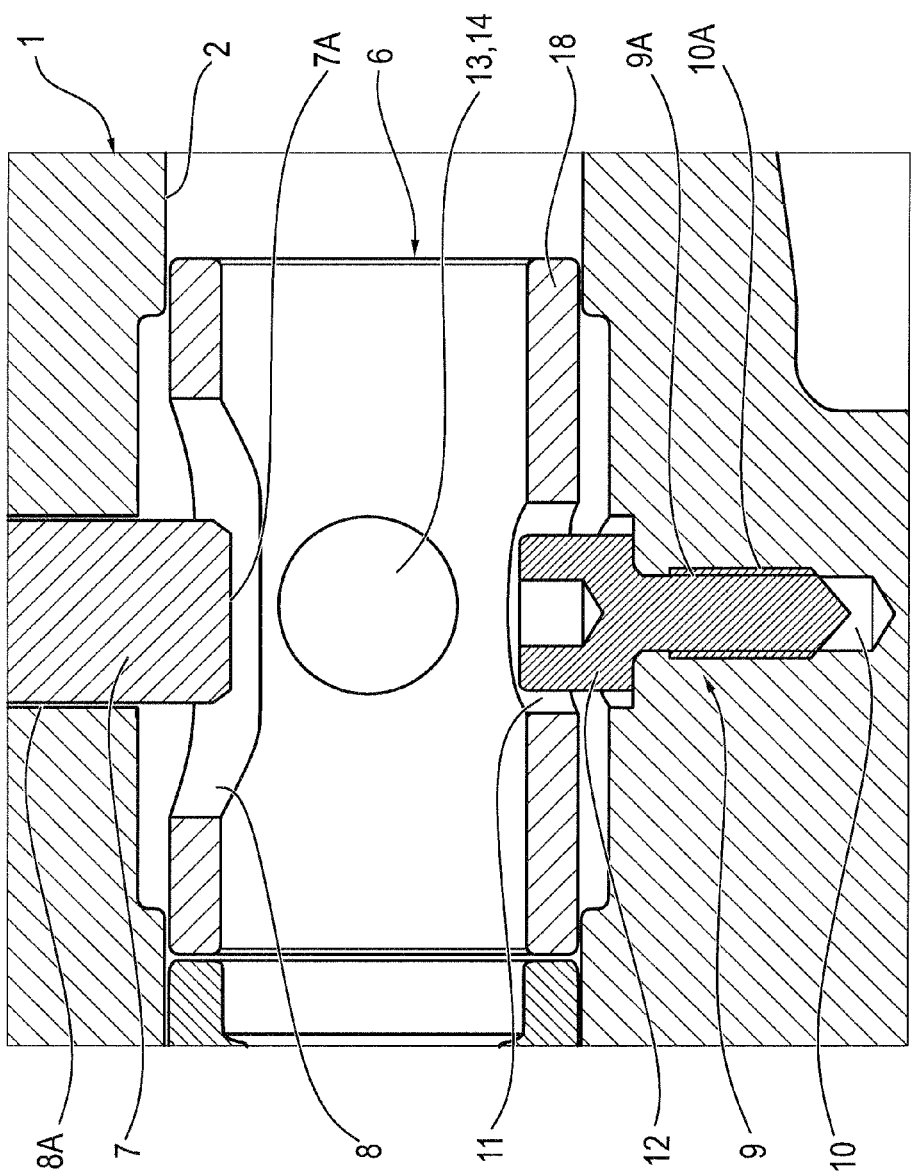
FIG. 5 shows an enlarged longitudinal section through the part of the bearing housing as per FIG. 4.

Furthermore, FIGS. 4 and 5 show the arrangement of the rotational speed sensor 7 in a sensor recess (sensor bore) 8 of the bearing housing 1. The rotational speed sensor 7 is provided with a threaded portion 19 which is formed as a self-locking thread, such that the rotational speed sensor 7 can be captively fixed in the bearing housing 1.

The juxtaposition of FIGS. 4 and 5 furthermore shows that the spacer or spacer bush 6 is provided with a sensor recess 8 which is formed as a slot and which is arranged diametrically opposite a pin recess 11 likewise formed as a closed slot 11, as can also be seen from the illustration of FIG. 2.

The pin bore 10 is provided with an internal thread 10*a* into which the locating pin 9 can be screwed with its threaded portion 9*a*, such that in the mounted state of the locating pin 9 illustrated in FIGS. 2, 4 and 5, the pin head 12 of said locating pin engages into the pin recess 11 and thereby serves as a rotation prevention means for the spacer 6.

The rotational speed sensor 7 engages with its front end 7A into the sensor recess 8 such that said rotational speed sensor can be arranged close to the rotor shaft 17. FIGS. 4 and 5 also show that the spacer 6 is provided with two further bores 13 and 14, wherein owing to the sectional illustration of FIGS. 4 and 5, only one of said bores 13 and 14 is visible, whereas the respective other bore, which is not visible, is of identical design and arranged diametrically opposite. Said bores 13 and 14 serve as oil supply and oil discharge bores.

As is also shown by FIGS. 4 and 5, it is the case in the particularly preferred embodiment illustrated that the sensor recess 8 is formed so as to be longer than the pin recess 11 as viewed in the axial direction of the spacer 6, though this is not imperatively necessary.

Owing to the above-described design of the spacer 6, for assembly of the bearing housing 1, the provision of a spacer 6 designed according to the invention can be followed by the arrangement of said spacer in the bearing bore 2. The locating pin 9 is then screwed, through the sensor recess 8 and through the pin recess 11, with its threaded portion 9*a* into the pin bore 10, wherein the pin head 12 engages into the pin recess 11 and thereby serves as a rotation prevention means. The bearing bushes 4 and 5 and the shaft 17 are subsequently mounted in the bearing housing 1. As a final assembly step, the rotational speed sensor 7 is mounted in the threaded portion 19 of the sensor bore 8A, wherein the front end 7A engages into the sensor recess 8, as can be seen in particular from the illustration of FIGS. 4 and 5.

Aside from the written disclosure of the invention above, reference is hereby explicitly made to the diagrammatic illustration of the invention in FIGS. 1 to 5.

LIST OF REFERENCE SYMBOLS

1 Bearing housing
2 Mounting bore
3 Bearing device
4, 5 Bearing bush
6 Spacer
7 Rotational speed sensor
7A Front end of the rotational speed sensor
8 Sensor recess
8A Sensor bore
9 Locating pin
9A Threaded portion of the locating pin
10 Pin bore
10A Internal thread
11 Pin recess as slot
12 Pin head
13, 14 Oil supply and oil discharge bores
15 Compressor
16 Turbine
17 Shaft
18 Cylindrical body
EGT Exhaust-gas turbocharger

The invention claimed is:

1. A bearing housing (1) of an exhaust-gas turbocharger (EGT), having
 a mounting bore (2);
 a bearing device (3) which has two bearing bushes (4, 5) which are arranged in the mounting bore (2), between which bearing bushes is arranged a spacer (6) having an oil supply bore (13), an oil discharge bore (14) arranged diametrically opposite the oil supply bore (13), a pin through-opening (11) and a sensor through-opening (8) arranged diametrically opposite the pin through-opening (11);
 a rotational speed sensor (7) which engages into the sensor through-opening (8) of the spacer (6); and
 a locating pin (9) having a threaded part and a pin head (12), which is screwed at its threaded part into a pin bore (10) in the bearing housing (1) and which engages with its pin head (12) into the pin through-opening (11) of the spacer (6);
wherein
 the pin through-opening (11) is formed as a slot.

2. The bearing housing as claimed in claim 1, wherein the sensor through-opening (8) is formed as a slot.

3. The bearing housing as claimed in claim 1, wherein the pin through-opening (11) and the sensor through-opening (8) are formed symmetrically.

4. The bearing housing as claimed in claim 1, wherein the spacer (6) has two symmetrically formed oil supply and oil discharge bores (13, 14) arranged diametrically opposite one another.

5. The bearing housing as claimed in claim 1, wherein the locating pin (9) is a screw with a threaded portion (9A) adjoining the pin head (12).

6. The bearing housing as claimed in claim 1, wherein the locating pin (9) is an internally situated cylinder head screw.

7. The bearing housing as claimed in claim 1, wherein the rotational speed sensor (7) has a threaded portion (19) with a self-locking thread.

8. The bearing housing as claimed in claim 1, wherein the diameter of the pin head is greater than the diameter of the pin threaded part.

9. A spacer assembly of an exhaust-gas turbocharger bearing housing (1) device (3), having
 a spacer (6) having a cylindrical body (18) with first and second ends; a sensor through-opening (8) on one side of the body (18); a pin through-opening (11) on a side of the body (18) arranged diametrically opposite the sensor through-opening (8); and an oil supply bore (13) and, arranged diametrically opposite the oil supply bore (13), an oil discharge bore (14), wherein the pin through-opening (11) is formed as a slot, and
 a locating pin (9) having a threaded part and a pin head (12), which is screwed at its threaded part into a pin bore (10) in the bearing housing (1) and which engages with its pin head (12) into the pin through-opening (11) of the spacer (6).

10. The spacer assembly as claimed in claim 9, wherein the sensor through-opening (8) is formed as a slot.

11. The spacer assembly as claimed in claim 9, wherein the pin through-opening (11) slot is axially elongate.

* * * * *